United States Patent
Rao et al.

[11] Patent Number: 5,912,048
[45] Date of Patent: Jun. 15, 1999

[54] PASSIVATION CARBONACEOUS ADSORPTIVE MEMBRANES

[75] Inventors: Madhukar Bhaskara Rao; Madhu Anand, both of Allentown, Pa.

[73] Assignee: Air Products and Chemicals, Inc., Allentown, Pa.

[21] Appl. No.: 08/918,176

[22] Filed: Aug. 25, 1997

Related U.S. Application Data

[63] Continuation-in-part of application No. 08/604,065, Feb. 20, 1996, abandoned, which is a continuation of application No. 08/296,373, Aug. 25, 1994, abandoned.

[51] Int. Cl.[6] .............................. B05D 3/02; B05D 3/04; C01B 31/10
[52] U.S. Cl. ...................... 427/228; 264/29.6; 264/29.7; 427/244; 427/374.1; 427/377; 427/398.4
[58] Field of Search .................... 427/226, 227, 427/228, 374.2, 244, 224, 374.1, 377, 379, 398.4; 264/29.2, 29.4, 29.6, 29.7

[56] References Cited

U.S. PATENT DOCUMENTS

| | | | |
|---|---|---|---|
| 3,395,970 | 8/1968 | Machell | 427/224 |
| 3,511,031 | 5/1970 | Ketteringham et al. | 96/8 |
| 3,775,078 | 11/1973 | Elmer et al. | 427/224 |
| 4,273,619 | 6/1981 | Angelo, II | 202/211 |
| 4,274,979 | 6/1981 | Simpson | 264/29.2 |
| 4,725,424 | 2/1988 | Tanaka et al. | 423/450 |
| 5,104,425 | 4/1992 | Rao et al. | 55/16 |
| 5,332,424 | 7/1994 | Rao et al. | 95/50 X |
| 5,354,547 | 10/1994 | Rao et al. | 95/50 X |
| 5,431,864 | 7/1995 | Rao et al. | 264/29.5 |
| 5,451,444 | 9/1995 | DeLiso et al. | 428/408 |

FOREIGN PATENT DOCUMENTS

| | | | |
|---|---|---|---|
| 0575945 | 12/1993 | European Pat. Off. | 96/11 |
| 2207666 | 3/1921 | United Kingdom . | |

OTHER PUBLICATIONS

Koresh, Jacob E. and Sofer, Abraham. "Molecular Sieve Carbon Permselective Membrane, Part 1. Presentation of New Devices for Gas Mixture Separation", Separation Science and Technology 18 (8) 1983: 723–34. (no month).

Verma, S. K. and Walker, P.L., Jr. "Carbon Molecular Sieves with Stable Hydrophobic Surfaces." Carbon 30 (6) 1992: 837–44 (no month).

*Primary Examiner*—Diana Dudash
*Attorney, Agent, or Firm*—John M. Fernbacher

[57] ABSTRACT

Porous carbonaceous adsorptive membranes are protected or passivated from surface degradation in moist air by oxidizing the surface at relatively mild conditions after initial preparation of the membrane by pyrolysis. Carbon dioxide is a preferred passivating gas. Contact of passivated membranes with moist air at ambient conditions unexpectedly improves membrane effectiveness in separating gas mixtures containing hydrogen and light hydrocarbons.

8 Claims, 14 Drawing Sheets

COMPARATIVE TEST A

● BEFORE WET AIR EXPOSURE
○ AFTER WET AIR EXPOSURE

UNPASSIVATED MEMBRANE — GRAPH A

AIR PASSIVATED MEMBRANE — GRAPH B

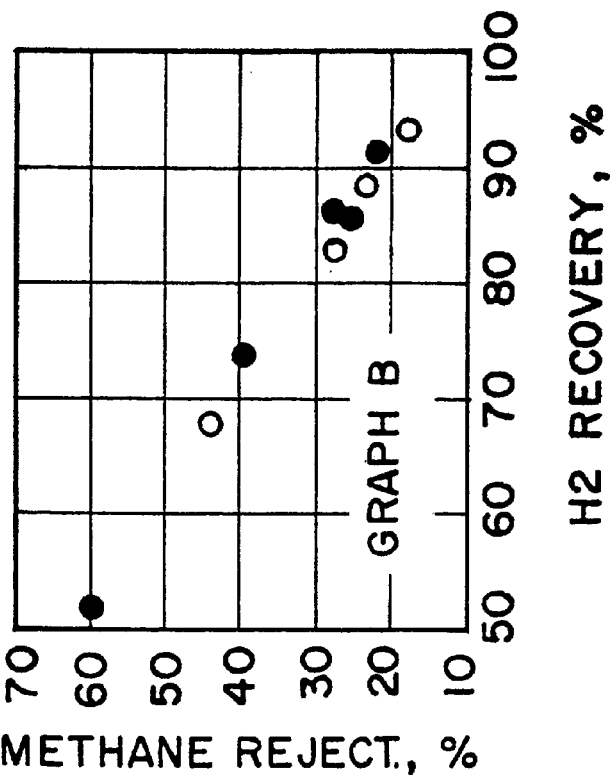
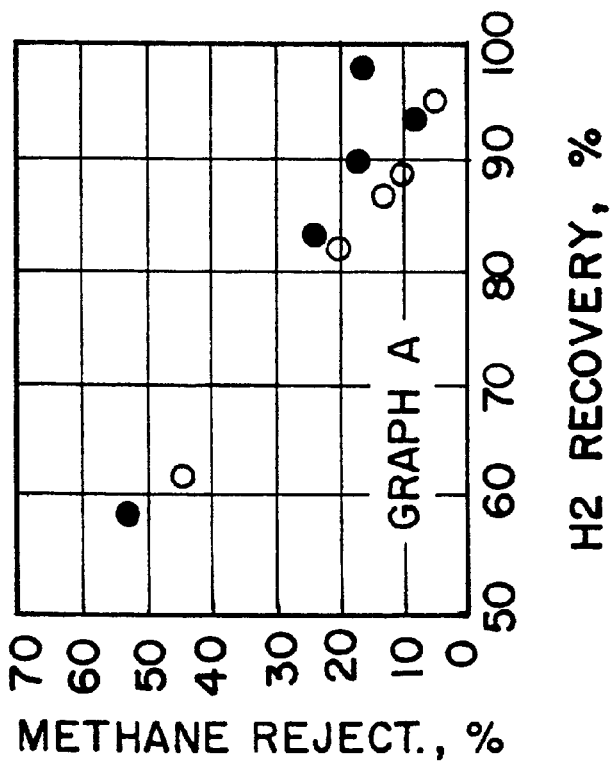
FIG. 3

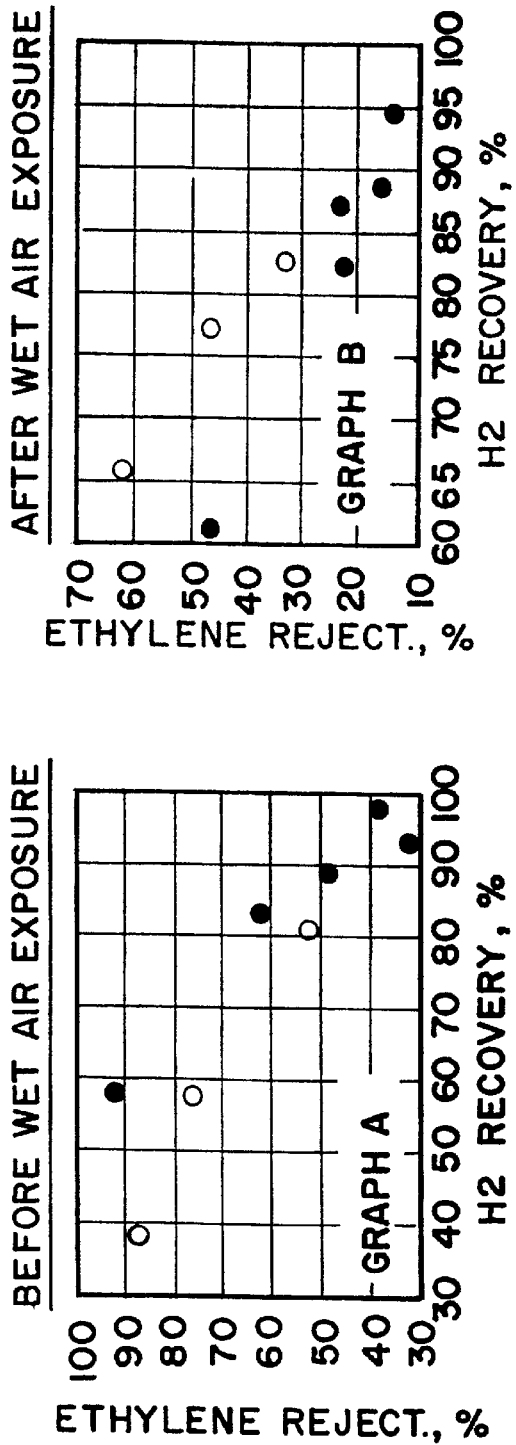
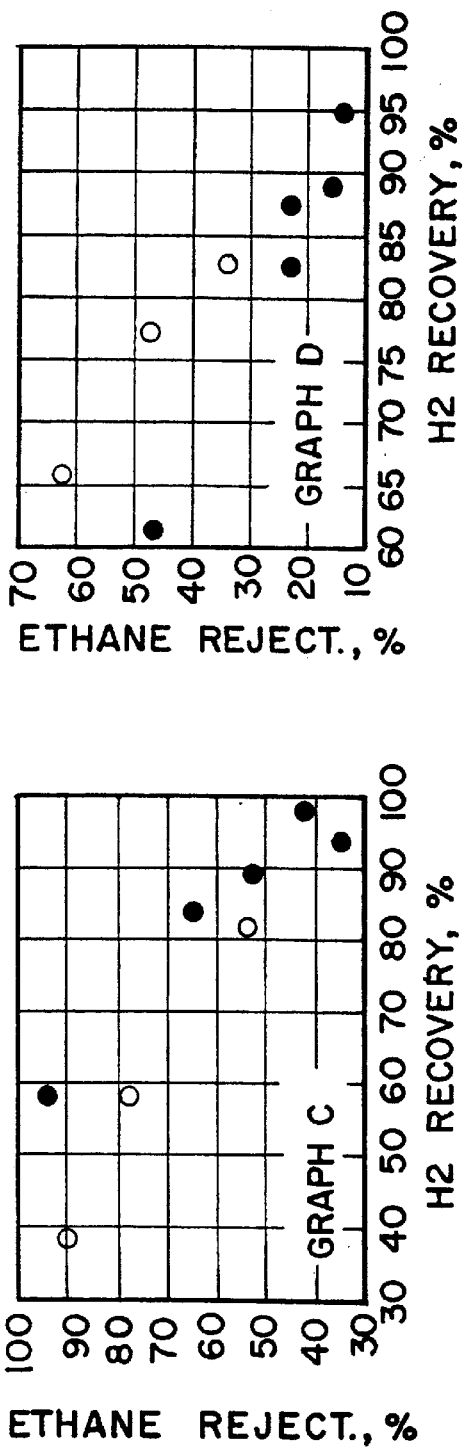
FIG. 5

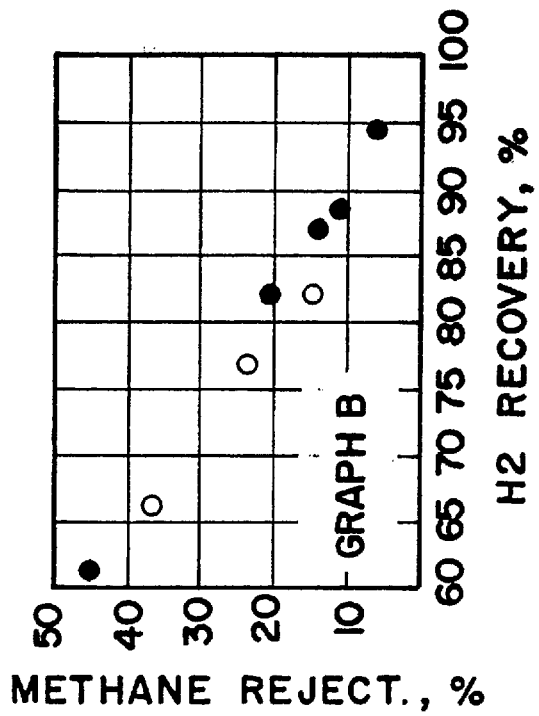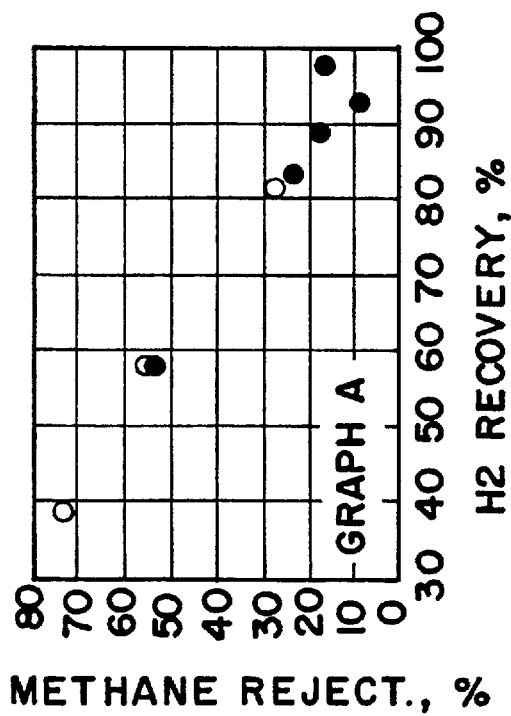
FIG. 6

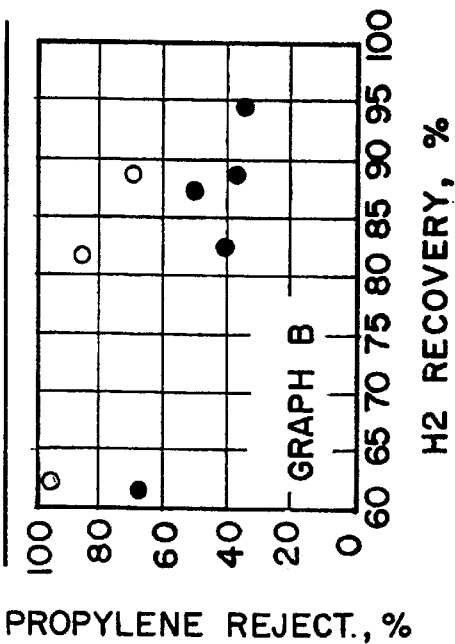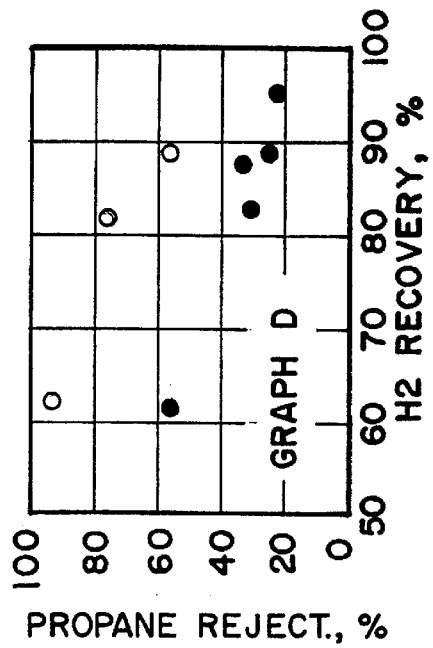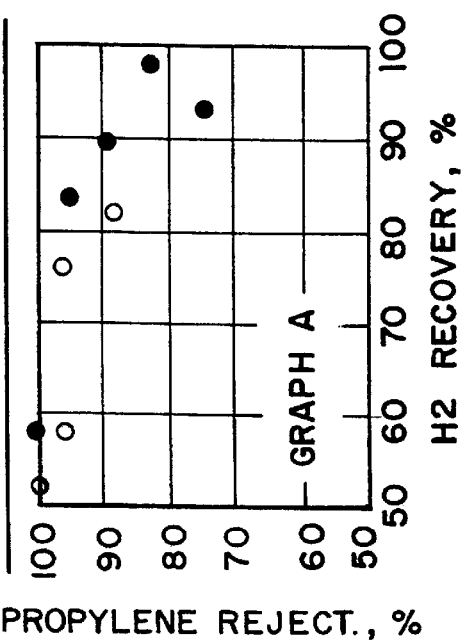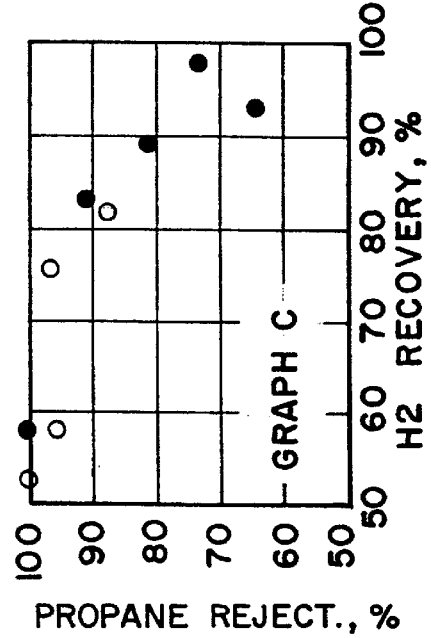
FIG. 7

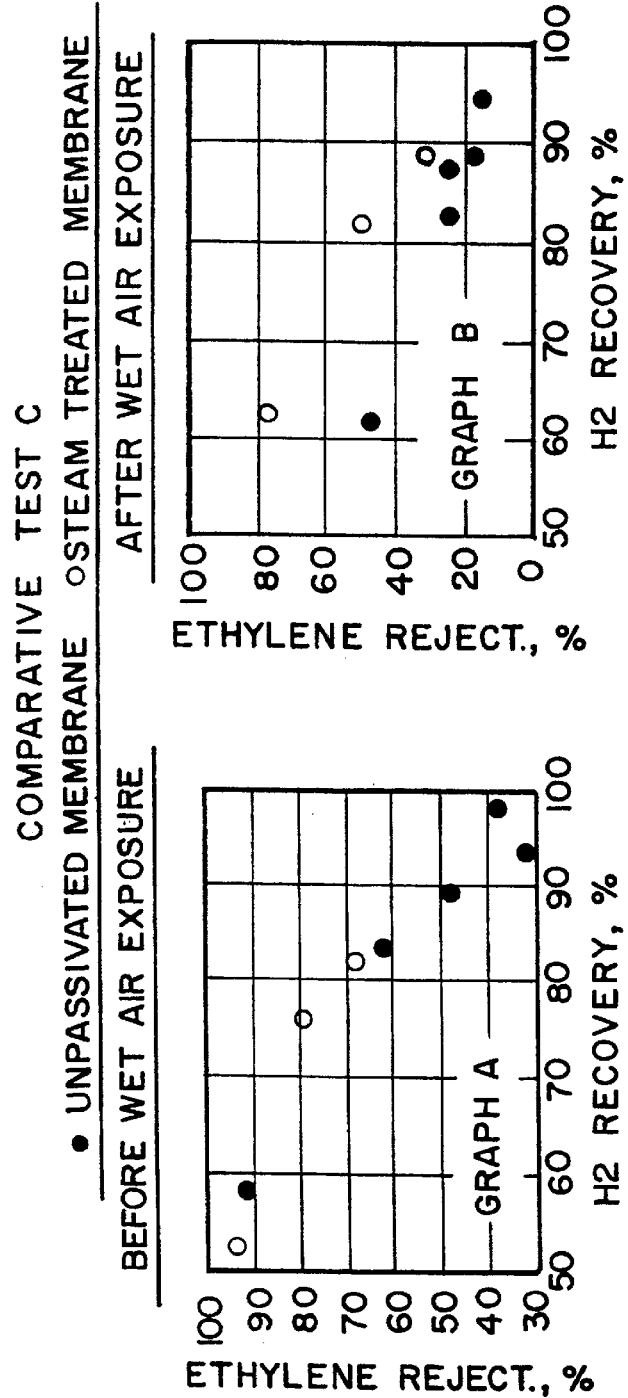
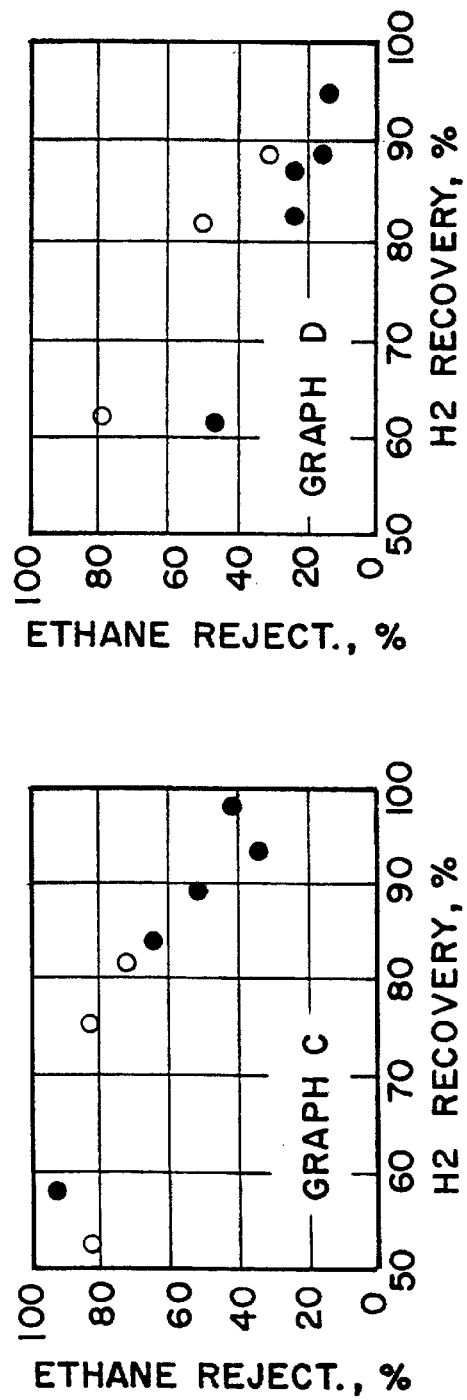
FIG. 8

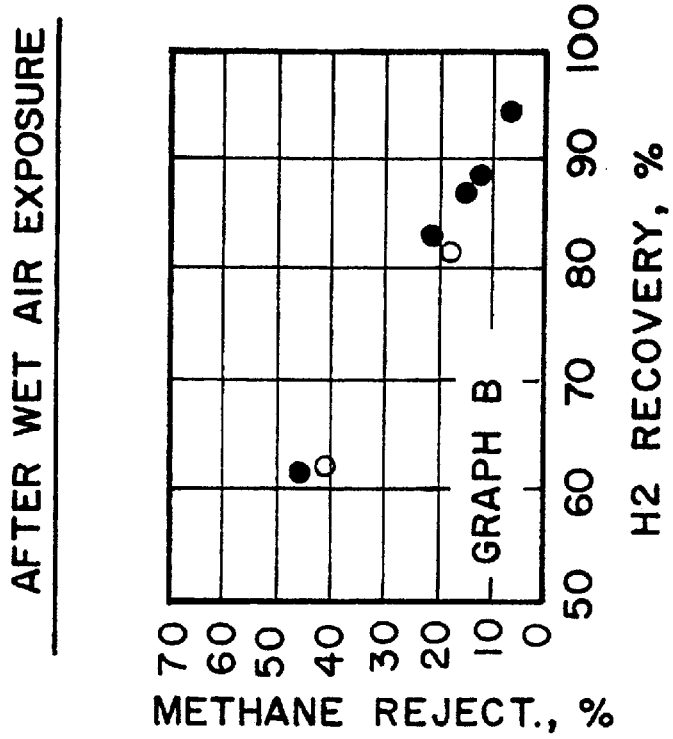
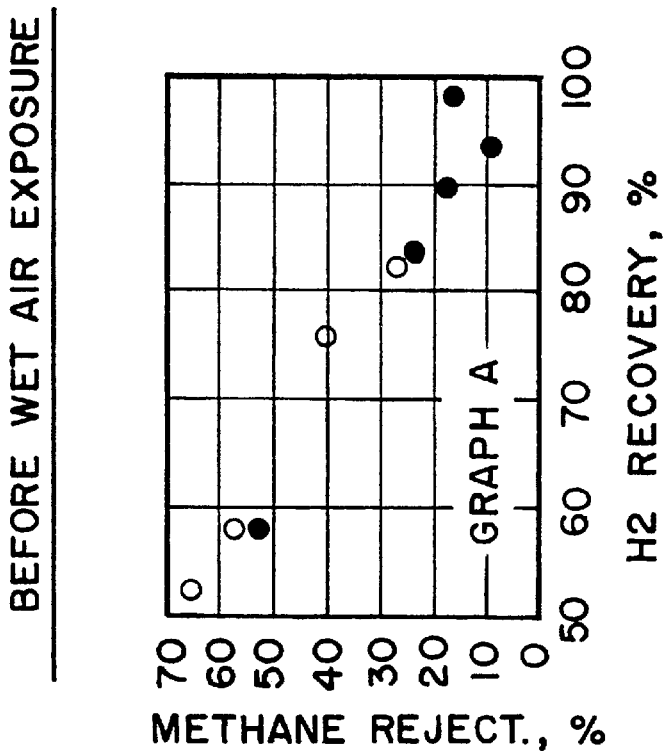
FIG. 9 ature in the range of about 600 to about 1200° C. to pyrolize the precursor material to form a layer of porous carbonaceous adsorptive material; (c) cooling the resulting porous carbonaceous adsorptive membrane to the range of about 200 to about 400° C. and
PASSIVATION CARBONACEOUS ADSORPTIVE MEMBRANES

CROSS-REFERENCE TO RELATED APPLICATIONS

This is a Continuation-in-Part of Ser. No. 08/604,065 filed on Feb. 20, 1996, now abandoned, which is a Continuation of Ser. No. 08/296,373 filed on Aug. 25, 1994, now abandoned.

STATEMENT REGARDING FEDERALLY SPONSORED RESEARCH OR DEVELOPMENT

Not applicable.

BACKGROUND OF THE INVENTION

This invention pertains to carbonaceous adsorptive membranes utilized for gas separation, and in particular to methods of passivation to protect such membranes against oxidative degradation in moist air.

Porous carbonaceous membranes separate gas mixtures based upon differing interactions of the molecules in a given gas mixture with the membrane pores. Such membranes can be utilized in continuous processes for gas separation as alternatives to well-known cyclic pressure swing adsorption processes.

One type of porous carbonaceous membrane is a carbon molecular sieve membrane having a microporous structure in which the pore diameters are in the same range as the molecular diameters of the components in the gas mixture. The average pore diameter is controlled during preparation of the membrane so that smaller gas molecules in the mixture pass into the pores while larger gas molecules are excluded from the pores when the gas mixture contacts the membrane. This mechanism is the basis for effecting separation of the gas mixture by molecular sieving based on molecular size relative to carbon pore size. Such membranes are described by J. E. Koresh and A. Sofer in an article entitled "Molecular Sieve Carbon Permselective Membranes. Part 1. Presentation of New Device for Gas Mixture Separation" in *Separation Science and Technology* 18(8), pp. 723–734, 1983. Carbon molecular sieve membranes are prepared by controlled pyrolysis of polymeric material followed optionally by high temperature oxidation to adjust the average pore diameter. Further methods of preparing such membranes include post-pyrolysis treatment by contacting with air, carbon dioxide, or hydrogen, optionally followed by activation with air, oxygen, carbon dioxide, or water vapor. Such methods are described in UK Patent GB 2 207 666 B.

Another type of porous carbonaceous membrane is an adsorptive carbonaceous membrane having a microporous structure in which the pore diameters are larger than the molecular diameters of the components in the gas mixture, but not large enough to allow significant Knudsen diffusion. The average pore diameter is controlled during preparation of the membrane so that when the prepared membrane is contacted with a gas mixture, more strongly adsorbable molecules in the mixture are preferentially adsorbed and permeate through the membrane in an adsorbed fluid phase to yield a permeate enriched in the more strongly adsorbable molecules. The less strongly adsorbable molecules permeate through the membrane to a lesser extent, and therefore the non-permeate gas is enriched in the less strongly adsorbable molecules. This mechanism is the basis for effecting separation of the gas mixture based on differences in adsorption characteristics. Carbonaceous adsorptive membranes are prepared by controlled pyrolysis of polymeric material to yield the desired pore size distribution described above. Optionally, further high temperature treatment following pyrolysis is carried out in an oxidizing atmosphere to modify the porosity or adsorptive properties of the adsorbent membrane. Such membranes and methods for preparation are described in U.S. Pat. No. 5,104,425.

Carbonaceous molecular sieves in the form of bulk granules are well-known for use in gas separation processes. Such materials are used in fixed-bed pressure swing adsorption processes which operate cyclically in contrast with a continuous process possible with the carbon molecular sieve membrane described above. Granular carbonaceous adsorbents with pores larger than molecular sieve dimensions are well-known for use in pressure swing or vacuum swing adsorption processes, and such processes operate cyclically in contrast with a continuous process possible with the porous carbonaceous adsorptive membrane described above.

Exposure of granular carbon molecular sieve materials to moist ambient air can reduce the effectiveness of such materials in pressure swing adsorption systems, for example those used for the separation of air, as described in a paper entitled "Carbon Molecular Sieves with Stable Hydrophobic Surfaces" by S. K. Verma and P. L. Walker, Jr. in *Carbon*, Vol. 30, No, 6, pp. 837–844, 1992. It was found that treatment with hydrogen at 5.5 MPa and 150° C. protected the carbon molecular sieve material from degradation caused by exposure to wet air. Treatment with hydrogen or chlorine at higher temperatures did not give satisfactory protection or passivation of the carbon.

The effects of exposing carbonaceous adsorptive membranes to wet air presently are not known in the art.

Carbon molecular sieve membranes and carbonaceous adsorptive membranes described above differ fundamentally in that the former depends critically on the carbon pore size relative to gas molecular sizes to effect gas separation, while the latter depends chiefly on the relative strength of adsorption of the gas molecules when the carbon pore size is in the broad range described above. Because of this fundamental difference, the effect of post-pyrolysis treatment on the gas separation properties of carbon molecular sieve membranes will be distinctly different from the effect on carbonaceous adsorptive membranes.

Post-pyrolysis treatment of carbonaceous adsorptive membranes has the potential for improving the properties and gas separation performance of the membranes. Improved membranes are desirable to reduce capital cost and power consumption in separation systems using such membranes. The methods disclosed in the following specification and defined in the appended claims offer such improvements in the use of carbonaceous adsorptive membranes.

BRIEF SUMMARY OF THE INVENTION

The invention is a method of making a porous carbonaceous adsorptive membrane suitable for the separation of gas mixtures which comprises the steps of (a) coating the surface of a porous substrate with a layer of an organic precursor; (b) heating the resulting coated porous substrate in an inert atmosphere to a temperature in the range of about 600 to about 1200° C. to pyrolize the precursor material to form a layer of porous carbonaceous adsorptive material; (c) cooling the resulting porous carbonaceous adsorptive membrane to the range of about 200 to about 400° C. and immediately thereafter contacting the membrane with a passivating gas comprising one or more components selected from the group consisting of oxygen, air, steam, carbon dioxide, hydrogen, chlorine, ethylene, and propylene in a temperature range of about 200 to about 400° C., wherein the pore structure of the membrane is essentially unchanged during the contacting; and (d) cooling the resulting passivated membrane to ambient temperature. Optionally, an additional step of contacting the resulting passivated membrane with moist air at ambient temperature can be carried out.

Preferably, the passivating gas is carbon dioxide. Optionally, the cooling step (d) can be carried out in a carbon dioxide atmosphere. During the passivation step, contacting with the passivating gas is carried out preferably for a period of about 15 to about 240 minutes in the preferred pressure range of about 14.7 to about 20 psia.

The layer of organic precursor may comprise a polymeric material selected from the group consisting of polyvinylidene chloride, polyvinyl chloride, polyacrylonitrile, styrene-divinyl benzene copolymer, and mixtures thereof.

BRIEF DESCRIPTION OF SEVERAL VIEWS OF THE DRAWINGS

FIG. 3 presents a comparison of membrane performance as defined by methane rejection vs. hydrogen recovery for the same membranes and conditions as FIG. 1.

FIG. 5 presents a comparison of membrane performance as defined by ethylene and ethane rejection vs. hydrogen recovery for the same membranes and conditions as FIG. 4.

FIG. 6 presents a comparison of membrane performance as defined by methane rejection vs. hydrogen recovery for the same membranes and conditions as FIG. 4.

FIG. 7 presents a comparison of membrane performance as defined by propylene and propane rejection vs. hydrogen recovery in the separation of a mixture of hydrogen and light hydrocarbons by a carbonaceous adsorptive membrane, before and after membrane exposure to wet ambient air, for an unpassivated membrane and a membrane passivated by another alternative method using high temperature water vapor.

FIG. 8 presents a comparison of membrane performance as defined by ethylene and ethane rejection vs. hydrogen recovery for the same membranes and conditions as FIG. 7.

FIG. 9 presents a comparison of membrane performance as defined by methane rejection vs. hydrogen recovery for the same membranes and conditions as FIG. 7.

DETAILED DESCRIPTION OF THE INVENTION

Figure 1:
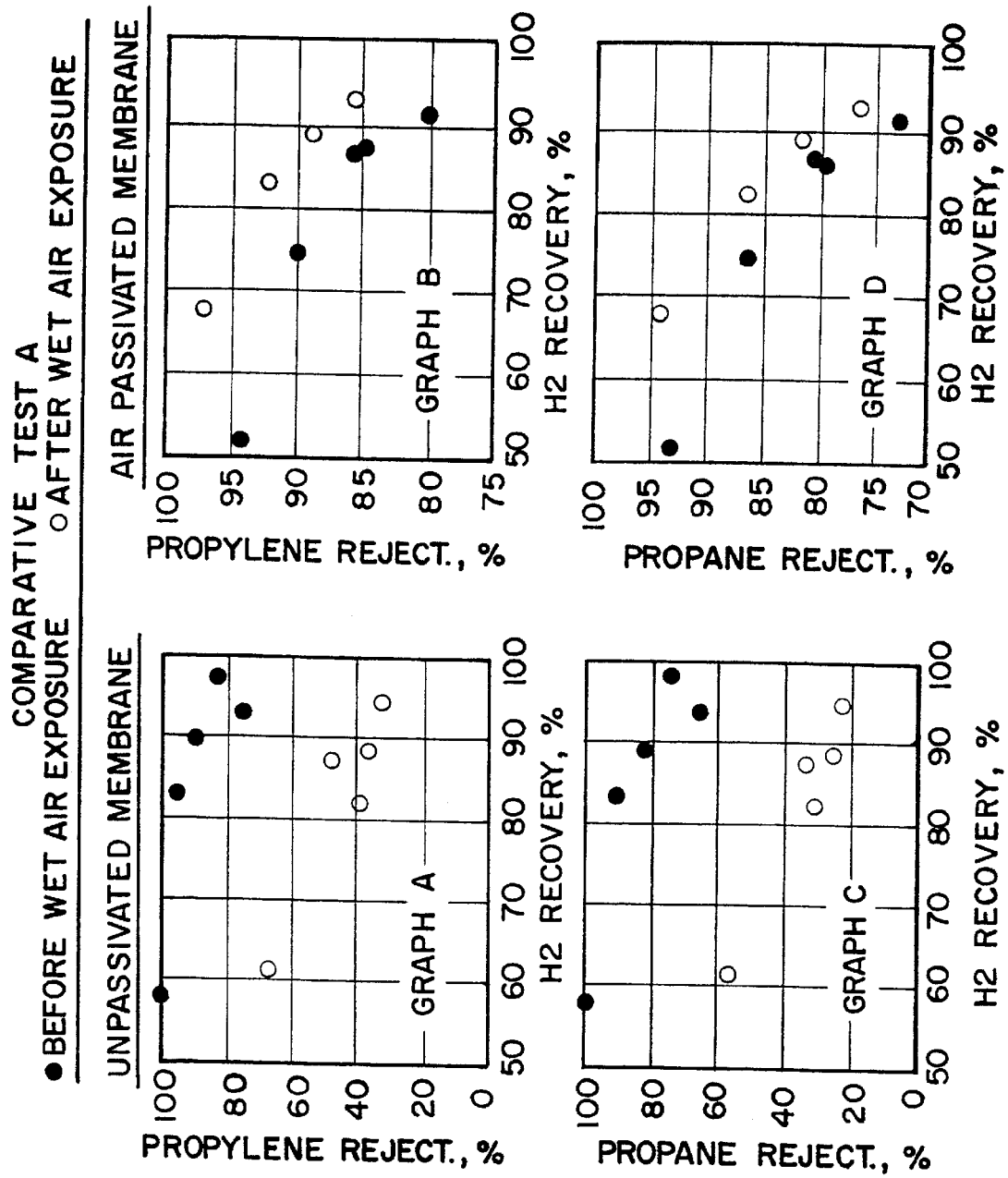
FIG. 1 presents a comparison of membrane performance as defined by propylene and propane rejection vs. hydrogen recovery in the separation of a mixture of hydrogen and light hydrocarbons by a carbonaceous adsorptive membrane, before and after exposure of the membrane to wet ambient air (80% relative humidity), for an unpassivated membrane and a membrane passivated by the method of the present invention.

The effect of moist ambient air on the separation properties of carbonaceous adsorptive membranes can be an important factor in the design and operation of gas separation systems which utilize such membranes. In the fabrication, installation, and maintenance of membrane modules for such systems, the membrane material usually will be in contact with moist ambient air. If membrane properties degrade during such contact, gas separation performance will decrease, thereby reducing product recovery, product purity, or production rate.

Prior to the developments of the present invention, the effect of moist ambient air on the separation properties of carbonaceous adsorptive membranes was not known in the art. As will be seen in the experimental results described below, exposure of carbonaceous adsorptive membranes to moist ambient air in fact can reduce the separation efficiency of such membranes, in particular for commercially important gas mixtures containing hydrogen and light hydrocarbons. This previously unrealized problem is solved in the present invention by passivation of the membrane by selective oxidation, preferably in an additional step following the pyrolysis step during membrane fabrication. The term passivation is used herein to mean protection of the carbonaceous membrane surface against deterioration in moist ambient air which would adversely affect the effectiveness membrane in gas separation processes. The pyrolyzed membrane is cooled from the pyrolysis temperature to an intermediate temperature and immediately contacted with passivating gas which selectively oxidizes the membrane. This selective oxidation preferably is carried out at conditions which modify the carbon surface without changing the carbon pore structure, i.e. without removing carbon by gasification. It was found unexpectedly that contact with moist air after passivation actually improved the membrane effectiveness, particularly for separation of hydrogen-light hydrocarbon mixtures.

The improved carbonaceous adsorptive membranes of the present invention are based upon the composite semipermeable membranes disclosed in U.S. Pat. No. 5,104,425, the specification of which is incorporated herein by reference. The basic membrane is prepared by coating the surface of a porous substrate with an organic precursor material which upon appropriate heating is converted by pyrolysis into a layer of porous adsorptive carbonaceous material which promotes the separation of the gas mixture of interest. The porous substrate can be a ceramic, carbonaceous, metallic, or polymeric material, or combinations thereof, which has a distribution of pore diameters between about 0.2 and 50 microns and which has essentially no effect upon the diffusion and separation of the gas mixture of interest. The substrate can be in the form of a flat sheet or a hollow fiber or tube. The typical thickness of a flat sheet substrate is 10 to 500 microns and the wall thickness of a hollow fiber or tube substrate is 3 to 500 microns.

In a representative method of making the composite membrane, the substrate is coated with a layer of a latex or solution containing polyvinylidene chloride, polyvinyl chloride, polyacrylonitrile, styrene-divinyl benzene copolymer, or mixtures thereof, or other polymers. The latex or solution can contain a single polymer or a mixture of polymers, and may contain small amounts of other compounds to control certain physical properties of the latex or solution. The latex or solution is applied to the surface of the substrate by a suitable method such as brushing, spraying, or immersion, and the amount of latex or solution applied is controlled so that a desired thickness of the final layer of porous adsorptive is obtained. A suitable substrate for this membrane is porous graphite having an average pore diameter between about 0.2 and 50 microns and a typical thickness of 250 microns. The latex-coated substrate is then heated in an inert atmosphere such as nitrogen at a heating rate of up to 1.0° C./min to a maximum temperature of between about 600° and about 1200° C., followed by cooling to a lower temperature, preferably ambient temperature. The cooling rate is important, and generally should be less than 10° C./min. The heating pyrolyzes or carbonizes the polymer to yield a thin layer of porous carbon on the surface of the substrate to form an asymmetric or composite membrane. The porous material formed in this manner can selectively adsorb and separate components of the gas mixtures of interest previously described. Performance optionally can be improved by repeating the latex coating and carbonization steps one or more times, up to typically four or five times. These membranes are useful for recovering hydrogen from mixtures with light hydrocarbons such as methane, ethane, propane, and butane to yield a permeate enriched in the hydrocarbons and a hydrogen-rich product essentially at the feed pressure.

The adsorptive membrane prepared by this procedure is then subjected to additional treatment to passivate the surface for protection against degradation in moist ambient air as outlined above and described in detail in the Examples which follow. Preferably, the passivation step is carried out immediately after the pyrolysis step by cooling the membrane to an intermediate temperature and carrying out the passivation procedure. This is accomplished following pyrolysis by cooling the pyrolyzed porous carbonaceous adsorptive membrane to the range of about 200 to about 400° C. and immediately thereafter contacting the membrane with a passivating gas comprising one or more components selected from the group consisting of oxygen, air, steam, carbon dioxide, hydrogen, chlorine, ethylene, and propylene in a preferred temperature range of about 200 to about 400° C. During the passivation step, the pore structure of the membrane should remain essentially unchanged by contacting with the passivating gas, and none of the basic carbon structure should be gasified. The passivated membrane is cooled to ambient temperature in the passivating gas or alternatively in an inert gas. Optionally, an additional step of contacting the resulting passivated membrane with moist air at ambient temperature can be carried out.

Preferably, the passivating gas is carbon dioxide, and optionally the cooling step (d) can be carried out in a carbon dioxide atmosphere. During the passivation step, contacting with the passivating gas is carried out preferably for a period of about 15 to about 240 minutes in the preferred pressure range of about 14.7 to about 20 psia.

COMPARATIVE EXAMPLE A

Carbonaceous adsorptive membranes were prepared as flat sheets approximately 4 inches in diameter by the method described above in which polyvinylidene chloride latex was coated on porous graphite discs and carbonized at 600° C. in nitrogen. The heating rate was 1° C. per minute. Two of these membranes were assembled in a plate-and-frame test module with inlets for feed and sweep gas and outlets for permeate and non-permeate gas. The feed gas was passed through one side of the first membrane and the non-permeate therefrom was passed through one side of the second membrane. Methane as sweep gas was passed through the other side of the second membrane, and the combined sweep gas and permeate from the second membrane was passed as sweep gas through the other side of the first membrane. Sweep gas flowed through both membranes in a counter-current direction to the feed flow. Performance or effectiveness of the membrane module was determined at 25° C. by passing a feed mixture containing 20.0% hydrogen, 8.0% ethylene, 8.3% ethane, 20.2% methane, 14.9% propane, and 28.6% propylene (all mole %) across the high-pressure side of the module at 4.5 atm. A countercurrent sweep gas of methane was passed across the low-pressure side at 1.1 atm. Flow rates and compositions of the gas streams were determined and mass balances calculated for all components in the feed, permeate, and non-permeate streams. The performance or effectiveness of the membrane module was evaluated by calculating the hydrocarbon rejection as a function of hydrogen recovery for each hydrocarbon in the feed mixture. Hydrocarbon rejection is defined as the percentage of a given hydrocarbon in the feed gas which permeates through the membrane and is rejected at low pressure. Hydrogen recovery is defined as the percentage of hydrogen in the feed gas which does not permeate through the membrane and is recovered at essentially feed pressure. The membranes were removed from the module and exposed to 80% relative humidity air at ambient temperature for one week. The membrane module was reassembled and again evaluated at the same conditions.

Another set of carbonaceous membranes was prepared as above, but the membranes were passivated immediately following the pyrolysis step by cooling the membranes to 350° C. and contacting with zero-grade air for one hour at about atmospheric pressure and 1.5 l/min before cooling to ambient temperature for assembly in the test module as above. During the passivation step, no significant amounts of carbon were gasified during passivation, and thus it was concluded that the pore structure of the carbonaceous membrane was not changed. The performance or effectiveness of the membrane module was measured experimentally by the same method as above and evaluated calculating the hydrocarbon rejection as a function of hydrogen recovery for each hydrocarbon in the feed mixture. High values of both hydrocarbon rejection and hydrogen recovery indicate good membrane performance or effectiveness of separation, while low values indicate poor membrane performance or effectiveness.

Figure 2:
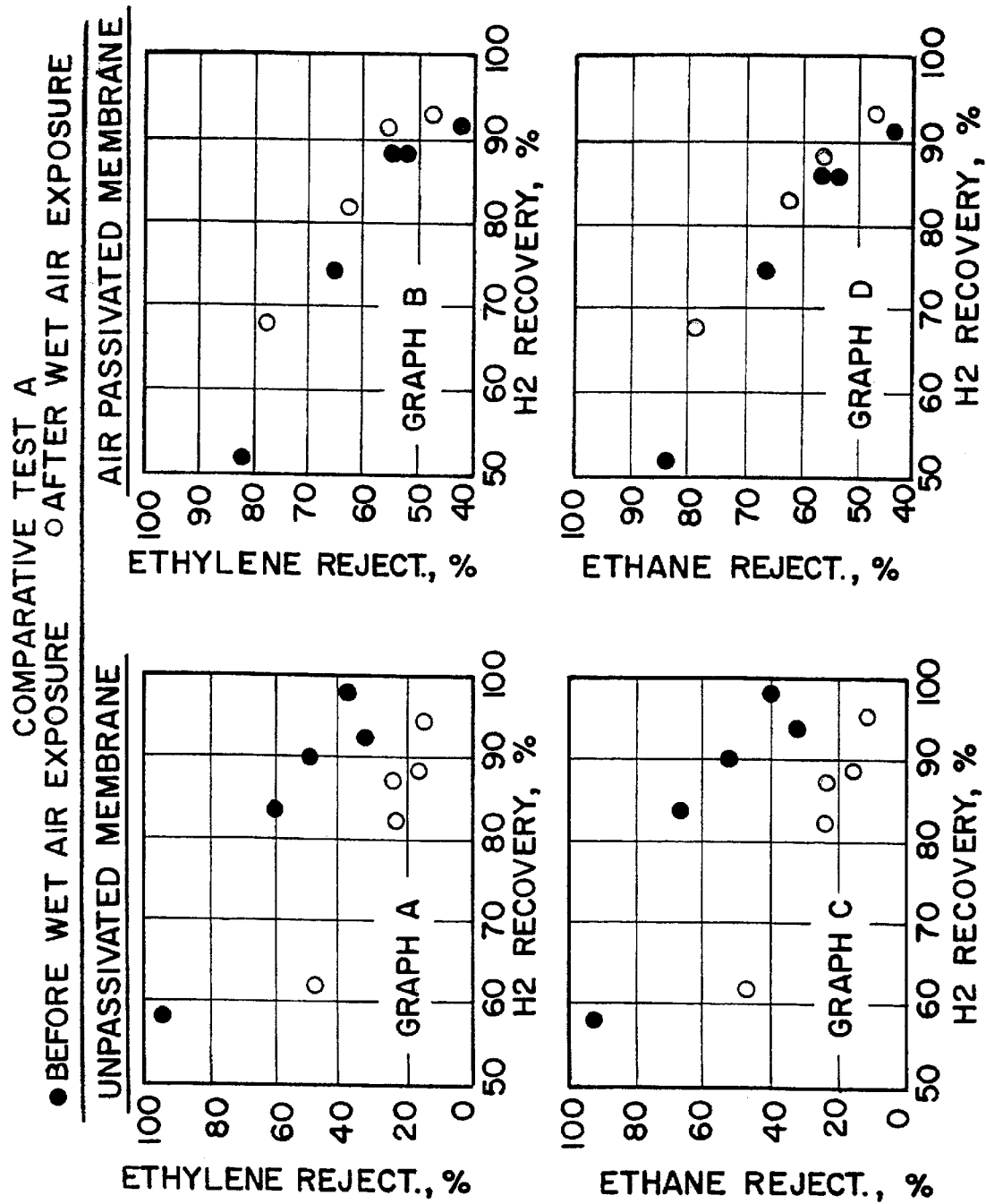
FIG. 2 presents a comparison of membrane performance as defined by ethylene and ethane rejection vs. hydrogen recovery for the same membranes and conditions as FIG. 1.

The results of the module test comparisons are given in FIGS. 1, 2, and 3. It is seen in FIG. 1, Graphs A and C, that the exposure of the untreated membrane to moist air significantly reduces the membrane performance or effectiveness in terms of propylene and propane rejection. Graphs B and D show unexpectedly that the performance or effectiveness of the air oxidized passivated membrane for these hydrocarbons is increased by exposure to wet air. The results of FIG. 2, Graphs A and C, also indicate that the exposure of the untreated membrane to moist air significantly reduces the membrane performance or effectiveness in terms of ethylene and ethane rejection. Graphs B and D show unexpectedly that performance or effectiveness of the air oxidized passivated membrane for these hydrocarbons is slightly increased by exposure to wet air, although to a lesser extent than for propane and propylene. The results in FIG. 3, Graph A, indicate that the exposure of the untreated membrane to moist air reduces the membrane performance or effectiveness in terms of methane rejection, although to a lesser extent than for the heavier hydrocarbons. Exposure of the air oxidized passivated membrane to moist air has essentially no effect on the membrane in terms of methane rejection. The oxidized passivated membrane exhibits better separation performance or effectiveness than the untreated membrane after both membranes are exposed to wet air as illustrated by FIGS. 1, 2, and 3.

The results shown in FIGS. 1, 2, and 3 indicate that the passivation method protects the membrane from degradation by contact with moist air in the case of methane rejection, and actually increases the performance or effectiveness of the membrane for rejecting the heavier hydrocarbons after the passivated membrane is contacted with moist air. A final contact of the passivated membrane with moist air is therefore a preferred step in membrane preparation which gives superior membrane performance.

COMPARATIVE EXAMPLE B

Another set of carbonaceous adsorptive membranes was prepared as above, but the membranes were treated following the pyrolysis step by oxidization with zero-grade air at 400° C. for 30 minutes at 14.7 psia and 1.5 l/min, and then cooled to ambient temperature. The membranes were reheated to 400° C., oxidized for 30 minutes, and cooled. The reheating, oxidation, and cooling steps were repeated again. During the oxidation steps some carbon was gasified and thus the pore structure of the carbonaceous membrane was changed. Performance of the membrane module was determined in the same manner as in the previous Example. The membranes were then exposed to 80% relative humidity air at ambient temperature for one week as in the previous Example, and the performance of the membrane module was again evaluated at the same conditions.

Figure 4:
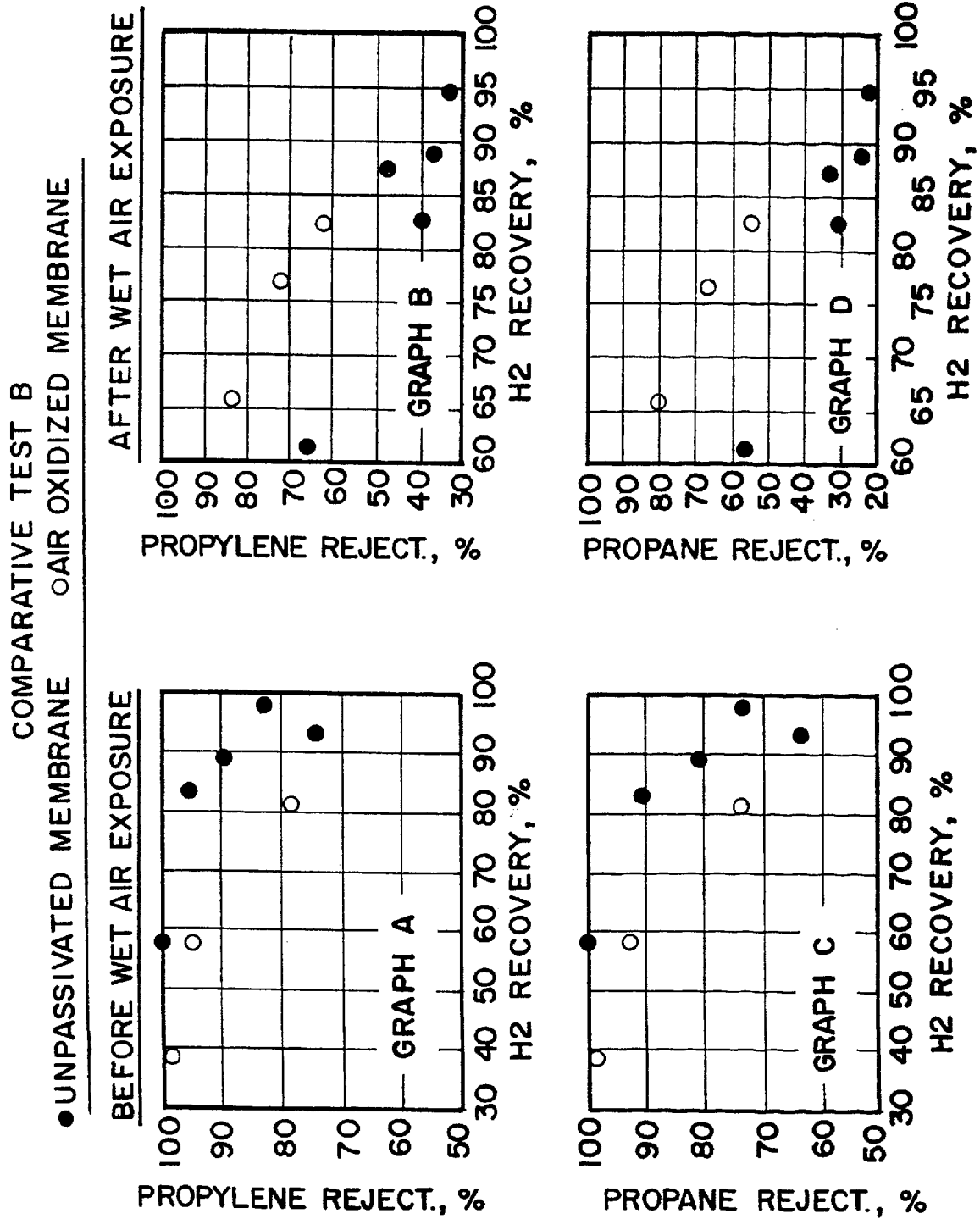
FIG. 4 presents a comparison of membrane performance as defined by propylene and propane rejection vs. hydrogen recovery in the separation of a mixture of hydrogen and light hydrocarbons by a carbonaceous adsorptive membrane, before and after membrane exposure to wet ambient air, for an unpassivated membrane and a membrane passivated by an alternative method using high temperature oxidation.
Figure 10:
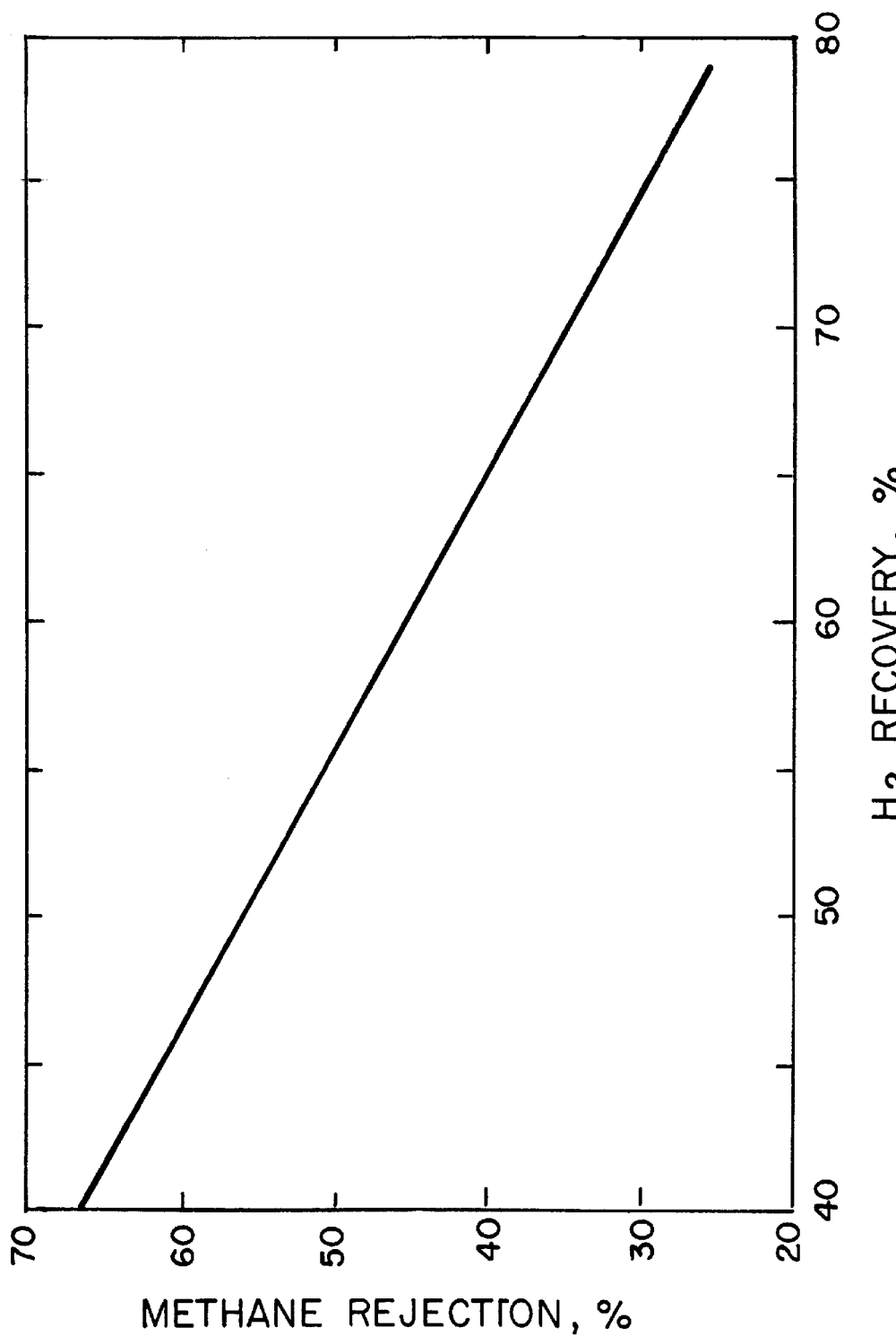
FIG. 10 is an average performance curve of methane rejection vs. hydrogen recovery from a mixture of 20% $H_2$, 20% $CH_4$, 8% $C_2H_6$, 8% $C_2H_4$, 29% $C_3H_6$ and 15% $C_3H_8$ (all vol %) using freshly-passivated membranes.
Figure 11:
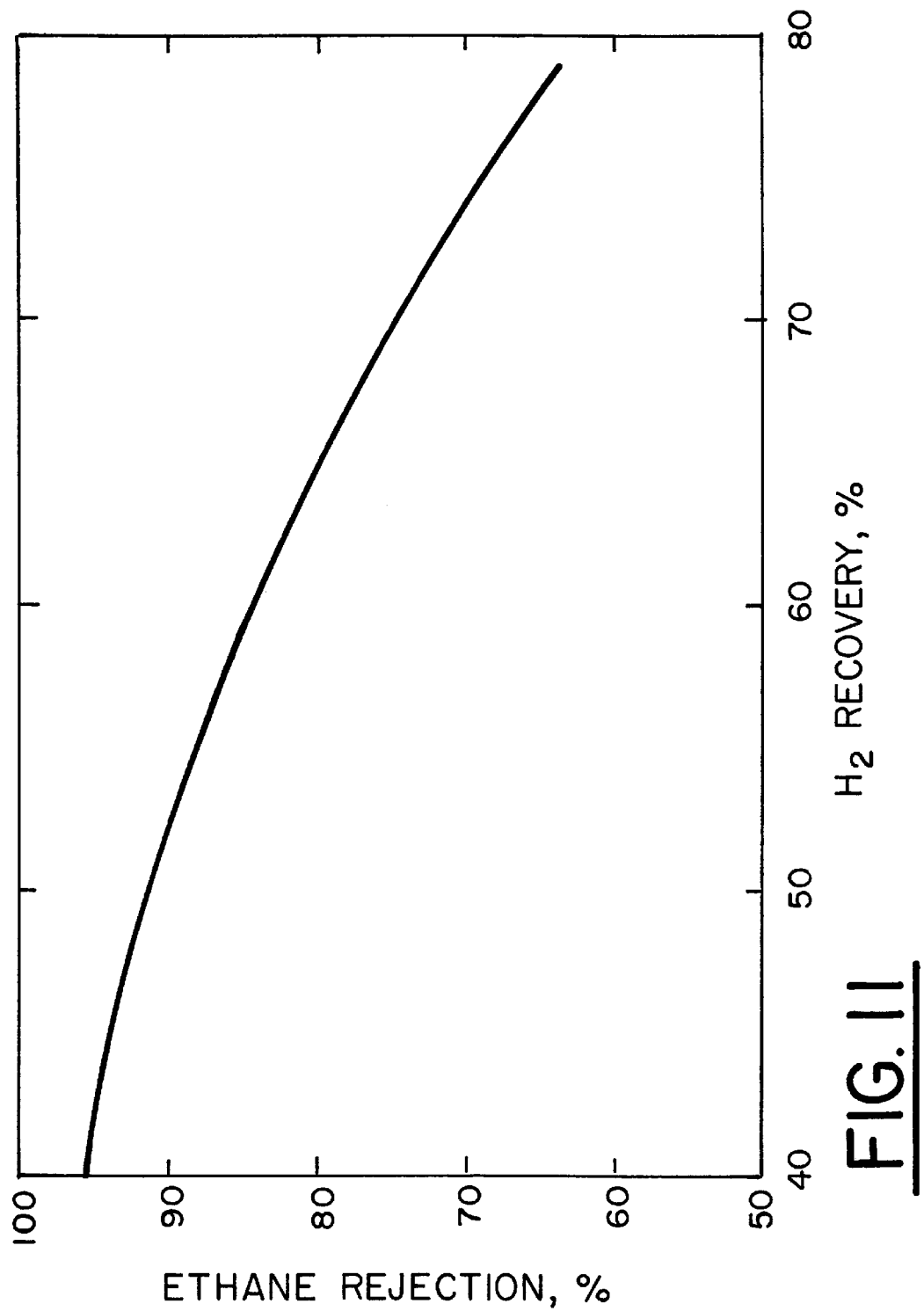
FIG. 11 is an average performance curve of ethane rejection vs. hydrogen recovery for the same mixture as FIG. 10 using freshly-passivated membranes.
Figure 12:
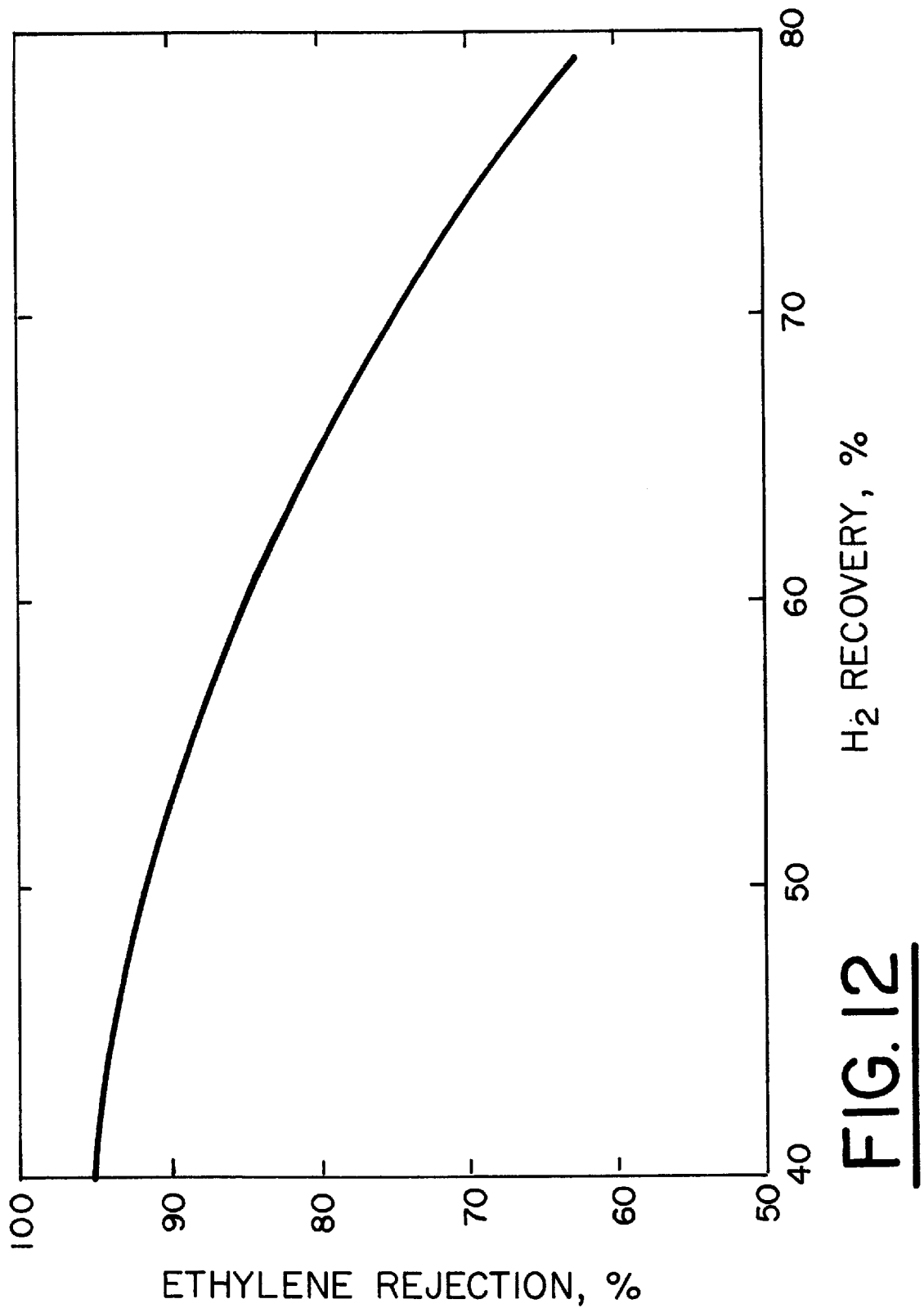
FIG. 12 is an average performance curve of ethylene rejection vs. hydrogen recovery for the same mixture as FIG. 10 using freshly-passivated membranes.
Figure 13:
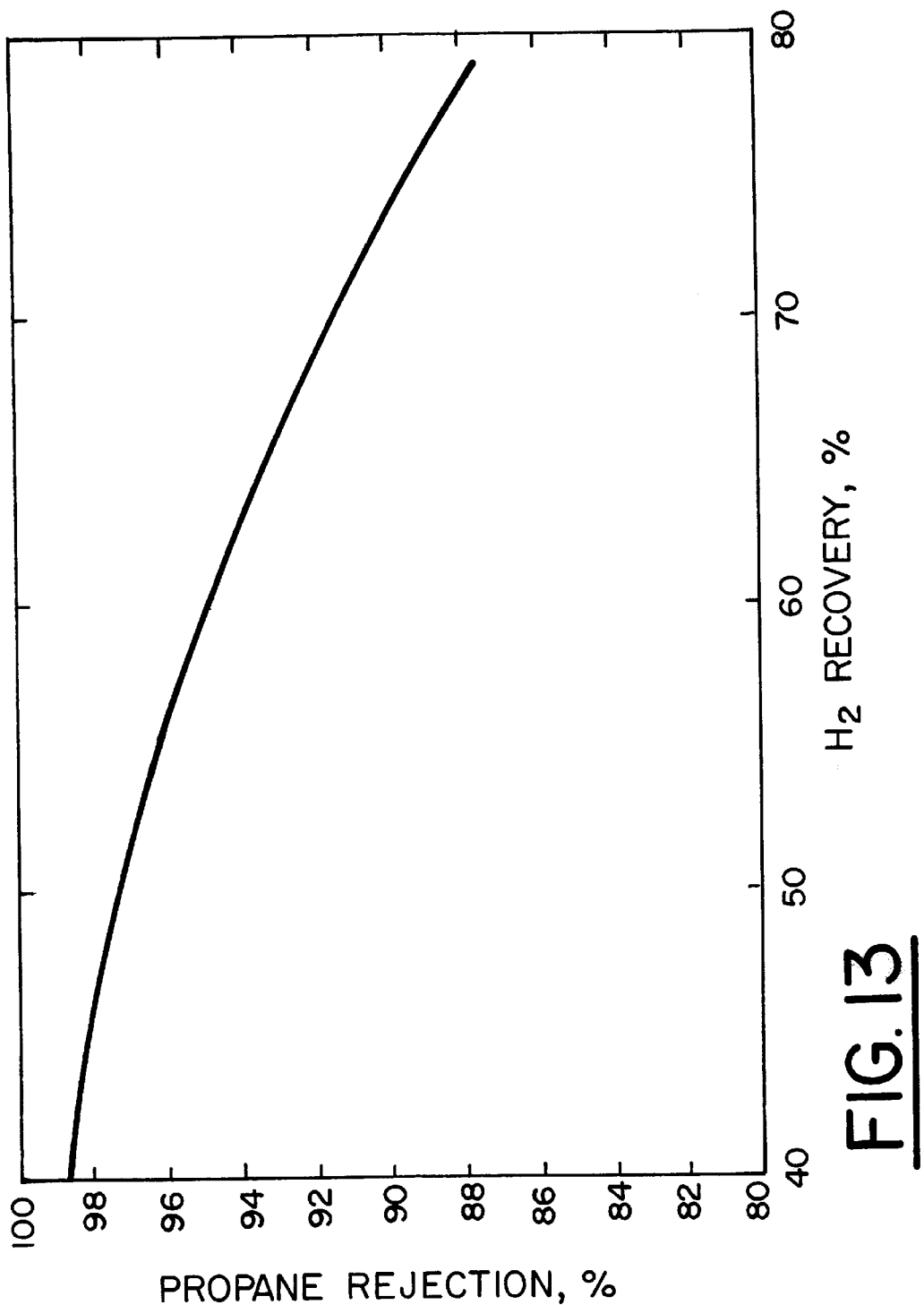
FIG. 13 is an average performance curve of propane rejection vs. hydrogen recovery for the same mixture as FIG. 10 using freshly-passivated membranes.
Figure 14:
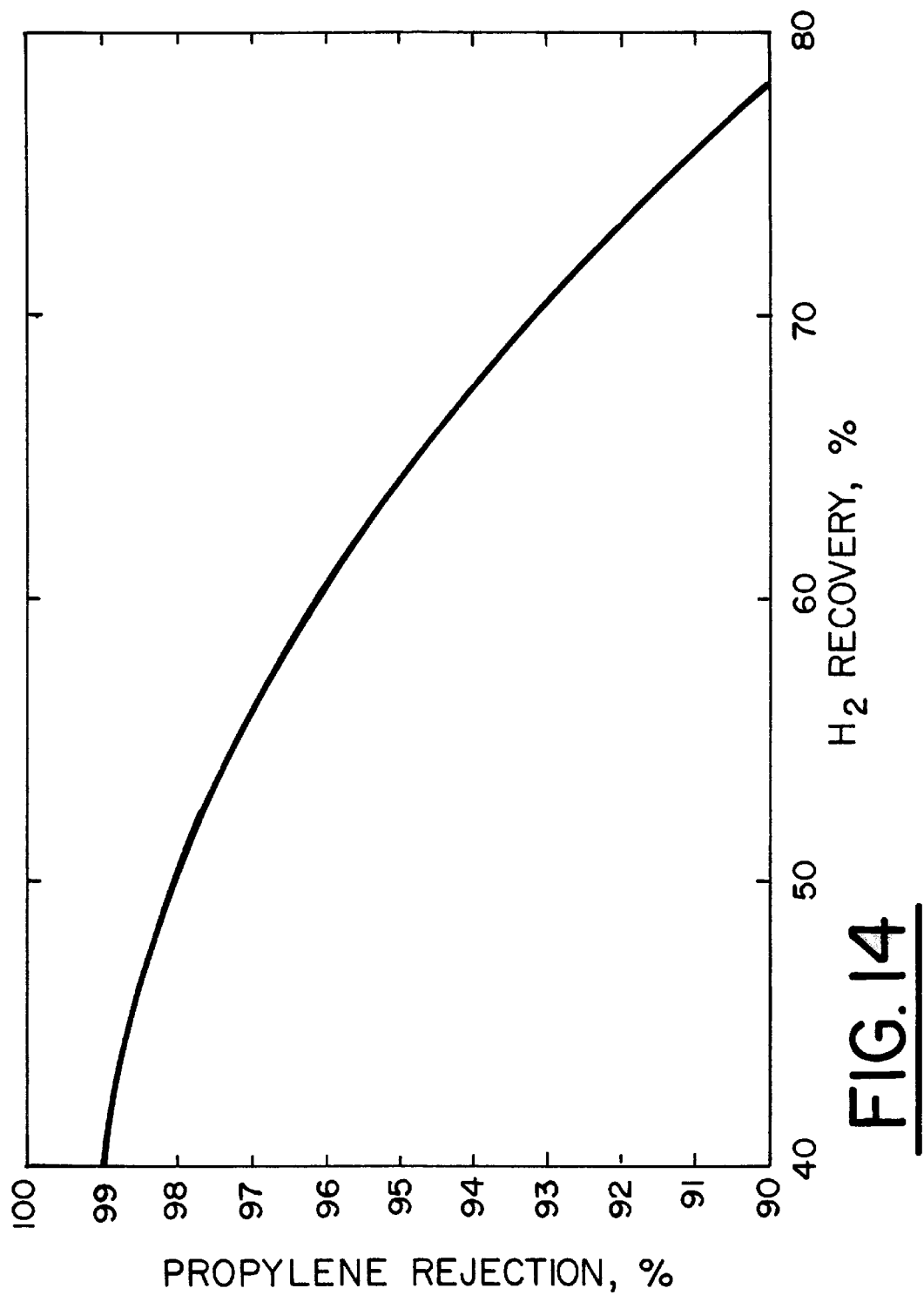
FIG. 14 is an average performance curve of propylene rejection vs. hydrogen recovery for the same mixture as FIG. 10 using freshly-passivated membranes.

The results of the module test comparisons are given in FIGS. 4, 5, and 6. It is seen in FIG. 3, Graphs A and B, that the exposure of the untreated membrane to moist air significantly reduces the membrane performance or effectiveness in terms of propylene rejection. Exposure of the air-oxidized membrane to moist air reduces the membrane performance or effectiveness somewhat, but to a much lesser extent than for the untreated membrane. Graphs C and D of FIG. 4 show the same relative performance effects for propane rejection as for propylene rejection. FIG. 5 presents test results for ethylene (Graphs A and B) and ethane (Graphs and D) rejection which exhibit similar relative behavior of untreated and air oxidized membranes as for propylene and propane in FIG. 4. FIG. 6 presents comparative performance or effectiveness for methane rejection vs. hydrogen recovery; the results show essentially no difference between untreated and air-oxidized membrane effectiveness, both of which are reduced by wet air exposure.

Based on the results of Comparative Test B, it is seen that some protection against degradation by wet air exposure is provided by the air oxidation steps. The air-oxidized membranes clearly perform more effectively than untreated membranes after wet air exposure for rejection of the hydrocarbons heavier than methane. The degree of protection against wet air exposure, however, is inferior to that provided by the method described above in Comparative Test A.

COMPARATIVE EXAMPLE C

Another set of carbonaceous adsorptive membranes was prepared as described in Example A, but the membranes were treated with steam following the pyrolysis step by exposure to a stream of nitrogen containing 11 mole % water at 450° C. for one hour. The treating gas was provided by injecting liquid water at 0.15 cc/min into 1.6 l/min of nitrogen at 293° K. and 1 atm pressure. At these conditions the steam-carbon reaction rate is extremely low, and therefore it was concluded that carbon loss was insignificant and that pore structure of the membrane was essentially unchanged. The performance of the membrane module was determined in the same manner as in the previous Examples. The membrane module was then exposed to 80% relative humidity air at ambient temperature for one week, and the performance of the membrane module was again evaluated at the same conditions.

The results of the module test comparisons are given in FIGS. 7, 8, and 9. It is seen in FIG. 7, Graphs A and B, that the exposure of the untreated membrane to moist air significantly reduces the membrane performance or effectiveness in terms of propylene rejection as earlier observed in Examples A and B. Exposure of the steam-treated membrane to moist air reduces the membrane performance or effectiveness somewhat, but to a much lesser extent than for the untreated membrane. Graphs C and D of FIG. 7 show the same relative performance effects for propane rejection as for propylene rejection. FIG. 8 presents test results for ethylene (Graphs A and B) and ethane (Graphs and D) rejection which exhibit similar relative behavior of untreated and steam-treated membranes as for propylene and propane in FIG. 7. FIG. 9 presents comparative performance results for methane rejection vs. hydrogen recovery; the results show essentially no difference between untreated and steam-treated membrane performance or effectiveness, both of which are reduced by wet air exposure.

Based on the results of Comparative Test C, it is seen that some protection against degradation by wet air exposure is provided by steam treatment. The steam-treated membranes clearly perform more effectively than untreated membranes after wet air exposure for rejection of the hydrocarbons heavier than methane. The degree of protection against wet air exposure, however, is inferior to that provided by the method described above in Comparative Test A.

A comparison of the results of Comparative Examples A, B, and C indicates that the mild oxidative treatment of Example A is the preferred method for protecting carbonaceous adsorptive membranes against degradation in performance or effectiveness caused by surface reactions with wet air. The preferred treatment passivates the membrane against performance degradation, and unexpectedly yields a membrane which exhibits improved performance after exposure to wet ambient air. The more aggressive treatments of Examples B and C give some protection against performance degradation due to wet air exposure compared with the untreated membranes. However, the treated membranes exhibit some performance degradation by wet air exposure compared with the treated membranes before wet air exposure.

COMPARATIVE EXAMPLE D

Carbon membranes were prepared by coating a porous ceramic tube (9 mm o.d.×6 mm i.d., average pore diameter= 0.3 microns) with a thin layer of polyvinylidene chloride polymer in the form of an aqueous latex having 3.4 wt % solids. The tube was suspended vertically and the bottom of the tube was closed off with a stopcock. The latex solution was passed through a syringe filter (2 microns) and the bore of the tube was filled with the filtered solution. The solution was drained from the bore of the tube after 2 minutes by opening the stopcock. The coated tube was then allowed to air dry and then was vacuum dried at 50° C. overnight. The dried coated tube was heated in a box furnace from room temperature to 600° C. at a heating rate of 15° C./min, held at 600° C. for 3 hrs, and cooled to the passivation temperature. The passivation was conducted immediately thereafter under the desired passivating gas for the desired time period, and the tube was then cooled to room temperature.

The performance of each passivated tube was tested by passing a feed mixture containing 20% $H_2$, 20% $CH_4$, 8% $C_2H_6$, 8% $C_2H_4$, 29% $C_3H_6$, and 15% $C_3H_8$ (all vol %) through the bore of the tube at 3 atm (absolute) and measuring the flowrates and compositions of the high pressure effluent and permeate stream (permeate pressure=1.2 atm abs). The feed gas flowrate was adjusted until approximately 50–60% of the hydrogen in the feed was contained in the high pressure effluent (i.e., 50–60% hydrogen recovery). The total rejection of each hydrocarbon component (the fraction of each hydrocarbon in the feed which permeated the membrane) was determined at that flow rate.

Performance testing as described above was done on each tube before and after exposure to 80% relative humidity air. Tubes were exposed to 80% relative humidity air by placing them in a sealed dessicator containing a saturated solution of $NH_4Cl$ for a specified period of time.

The performance of a membrane for separation of the test gas mixture having the above composition is defined by the performance ratio, $\alpha_i$, which is the ratio of (1) the measured % rejection of each $C_1$–$C_3$ hydrocarbon by an initially passivated membrane to (2) the average % rejection of that hydrocarbon as given in FIGS. 10–14 at the same % hydrogen recovery. Thus a performance ratio of less than 1.0 means that the membrane performance has degraded relative to the reference membrane. The curves presented in FIGS. 10–14 were determined from multiple data points obtained for freshly-passivated membranes using the above gas mixture, and provide a set of reference curves for comparing various passivation methods.

The test results for membranes passivated at different conditions are summarized below.

Passivation Condition (a)
Heating in air at 350° C. for 30 minutes
followed by cooling in $N_2$ to 25° C.

| | Performance Ratio, $\alpha_i$ | | |
|---|---|---|---|
| Component | t = 0 days | t = 6 days | t = 21 days |
| $C_3H_6$ | 1.004 | 1.008 | 0.989 |
| $C_3H_8$ | 1.005 | 0.994 | 0.936 |
| $C_2H_4$ | 0.999 | 0.995 | 0.826 |
| $C_2H_6$ | 1.010 | 0.970 | 0.820 |
| $CH_4$ | 1.074 | 1.001 | 0.813 |

Passivation Condition (b)
Heating in air at 350° C. for 30 minutes
followed by cooling in air to 25° C.

| | Performance Ratio, $\alpha_i$ | |
|---|---|---|
| Component | t = 0 days | t = 13 days |
| $C_3H_6$ | 1.020 | 1.007 |
| $C_3H_8$ | 1.021 | 0.980 |
| $C_2H_4$ | 1.044 | 0.914 |
| $C_2H_6$ | 1.040 | 0.920 |
| $CH_4$ | 1.078 | 0.829 |

Passivation Condition (c)
Heating in air at 350° C. for 120 minutes
followed by cooling in air to 25° C.

| | Performance Ratio, $\alpha_i$ | |
|---|---|---|
| Component | t = 0 days | t = 9 days |
| $C_3H_6$ | 1.018 | 0.990 |
| $C_3H_8$ | 1.022 | 0.962 |
| $C_2H_4$ | 1.009 | 0.891 |
| $C_2H_6$ | 1.005 | 0.887 |
| $CH_4$ | 1.102 | 0.947 |

Passivation Condition (d)
Heating in air at 350° C. for 240 minutes
followed by cooling in air to 25° C.

| | Performance Ratio, $\alpha_i$ | |
|---|---|---|
| Component | t = 0 days | t = 10 days |
| $C_3H_6$ | 1.001 | 0.939 |
| $C_3H_8$ | 0.991 | 0.807 |
| $C_2H_4$ | 0.987 | 0.802 |
| $C_2H_6$ | 0.990 | 0.752 |
| $CH_4$ | 1.094 | 0.917 |

Passivation Condition (e)
Heating in $CO_2$ at 350° C. for 15 minutes
followed by cooling in $CO_2$ to 25° C.

| | Performance Ratio, $\alpha_i$ | |
|---|---|---|
| Component | t = 0 days | t = 22 days |
| $C_3H_6$ | 1.006 | 0.993 |
| $C_3H_8$ | 1.007 | 1.001 |
| $C_2H_4$ | 1.004 | 0.903 |
| $C_2H_6$ | 1.039 | 0.915 |
| $CH_4$ | 1.024 | 0.956 |

Passivation Condition (f)
Heating in $CO_2$ at 350° C. for 30 minutes
followed by cooling in $CO_2$ to 25° C.

| | Performance Ratio, $\alpha_i$ | |
|---|---|---|
| Component | t = 0 days | t = 36 days |
| $C_3H_6$ | 1.001 | 0.993 |
| $C_3H_8$ | 1.002 | 0.954 |
| $C_2H_4$ | 0.994 | 0.849 |
| $C_2H_6$ | 0.998 | 0.849 |
| $CH_4$ | 1.062 | 0.820 |

Passivation Condition (g)
Heating in $CO_2$ at 350° C. for 60 minutes
followed by cooling in $CO_2$ to 25° C.

| | Performance Ratio, $\alpha_i$ | |
|---|---|---|
| Component | t = 0 days | t = 32 days |
| $C_3H_6$ | 1.012 | 1.013 |
| $C_3H_8$ | 1.009 | 0.993 |

| | -continued | |
|---|---|---|
| $C_2H_4$ | 1.036 | 0.957 |
| $C_2H_6$ | 1.051 | 0.948 |
| $CH_4$ | 1.071 | 0.976 |

Passivation Condition (h)
Heating in $CO_2$ at 350° C. for 240 minutes
followed by cooling in $CO_2$ to 25° C.

| | Performance Ratio, $\alpha_i$ | |
|---|---|---|
| Component | t = 0 days | t = 34 days |
| $C_3H_6$ | 1.019 | 1.013 |
| $C_3H_8$ | 1.025 | 1.007 |
| $C_2H_4$ | 1.067 | 0.984 |
| $C_2H_6$ | 1.008 | 0.995 |
| $CH_4$ | 1.229 | 1.029 |

Based on the results presented above, the preferred passivation method is the use of $CO_2$ as the passivating gas for at least 60 minutes contact time.

Thus the preferred treatment to passivate carbonaceous adsorptive membranes for protection against degradation by wet air exposure is to contact the membrane with carbon dioxide in a temperature range of about 200 to about 400° C. and a pressure between atmospheric and about 20 psia for about 15 to about 240 minutes. Preferably the passivation is carried out for about 60 to about 240 minutes. The carbon dioxide preferably is free of trace hydrocarbons. Alternatively, the passivation gas can comprise one or more components selected from oxygen, steam, air, hydrogen, chlorine, ethylene, and propylene.

The preferred protective treatment of the present invention is oxidative in nature, but does not alter the pore size of the membrane. A chemisorbed oxygen complex can occupy a significant fraction of a pore diameter without blocking access to the pore by gas molecules. In addition, such complexes may enhance the adsorption and the permeation selectivity of hydrocarbons by increasing the polarity of the surface. In contrast with the carbonaceous adsorptive membrane of the present invention, a carbon molecular sieve membrane may be harmed by oxidative treatment because chemisorbed oxygen complexes can sterically hinder the very small pores critical to molecular sieve performance. Much smaller molecules such as hydrogen are required for passivation of carbon molecular sieve membranes.

The essential characteristics of the present invention are described completely in the foregoing disclosure. One skilled in the art can understand the invention and make various modifications thereto without departing from the basic spirit thereof, and without departing from the scope of the claims which follow.

I claim:

1. A method of making a porous carbonaceous adsorptive membrane suitable for the separation of gas mixtures which comprises the steps of:

(a) coating the surface of a porous substrate with a layer of an organic precursor;

(b) heating the resulting coated porous substrate in an inert atmosphere to a temperature in the range of about 600 to about 1200° C. to pyrolize the precursor material to form a layer of porous carbonaceous adsorptive material;

(c) cooling the resulting porous carbonaceous adsorptive membrane to the range of about 200 to about 400° C. and immediately thereafter passivating the membrane, without removing carbon by gasification, by contacting the membrane with a passivating gas comprising one or more components selected from the group consisting of oxygen, air, steam, carbon dioxide, hydrogen, chlorine, ethylene, and propylene in a temperature range of about 200 to about 400° C., wherein the pore structure of the membrane is essentially unchanged during the passivating and contacting; and (d) cooling the resulting passivated membrane to ambient temperature.

2. The method of claim 1 which further comprises the step of (e) contacting the resulting passivated membrane with moist air at ambient temperature.

3. The method of claim 1 wherein the passivation gas is carbon dioxide.

4. The method of claim 1 wherein cooling step (d) is carried out in a carbon dioxide atmosphere.

5. The method of claim 1 wherein the contacting with the passivating gas is carried out for a period of about 15 to about 240 minutes.

6. The method of claim 5 wherein the contacting with the passivating gas is carried out for a period of about 60 to about 240 minutes.

7. The method of claim 1 wherein the contacting with the passivating gas is carried out in the pressure range of about 14.7 to about 20 psia.

8. The method of claim 1 wherein the layer of organic precursor comprises a polymeric material selected from the group consisting of polyvinylidene chloride, polyvinyl chloride, polyacrylonitrile, styrene-divinyl benzene copolymer, and mixtures thereof.

* * * * *